(12) United States Patent
Camara (10) Patent No.: US 7,237,197 B2
(45) Date of Patent: Jun. 26, 2007

(54) METHOD AND SYSTEM FOR PRESENTING A VIDEO STREAM OF A VIDEO STREAMING DEVICE

(75) Inventor: Franc J. Camara, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1185 days.

(21) Appl. No.: 09/841,360

(22) Filed: Apr. 24, 2001

(65) Prior Publication Data

US 2002/0083463 A1    Jun. 27, 2002

Related U.S. Application Data

(60) Provisional application No. 60/199,582, filed on Apr. 25, 2000.

(51) Int. Cl.
*G08B 13/00* (2006.01)
*G06K 13/00* (2006.01)

(52) U.S. Cl. ........................ 715/719; 715/838

(58) Field of Classification Search ........ 715/719–726, 715/790–791, 771–773, 964; 725/41, 43
See application file for complete search history.

(56) References Cited

U.S. PATENT DOCUMENTS

| | | | |
|---|---|---|---|
| 4,837,635 A | 6/1989 | Santos | |
| 5,191,645 A | 3/1993 | Carlucci et al. | |
| 5,385,475 A | 1/1995 | Sudman et al. | |
| 5,412,773 A | 5/1995 | Carlucci et al. | |
| 5,706,457 A | 1/1998 | Dwyer et al. | |
| 5,796,393 A | 8/1998 | MacNaughton et al. | |
| 5,796,945 A | 8/1998 | Tarabella | |
| 5,809,145 A | 9/1998 | Slik et al. | |
| 5,862,342 A * | 1/1999 | Winter et al. | 709/231 |
| 5,937,160 A | 8/1999 | Davis et al. | |
| 5,949,411 A | 9/1999 | Doerr et al. | |
| 5,974,235 A * | 10/1999 | Nunally et al. | 709/202 |
| 6,028,604 A | 2/2000 | Matthews, III et al. | |
| 6,031,573 A * | 2/2000 | MacCormack et al. | 375/240.16 |

(Continued)

OTHER PUBLICATIONS

"Digital Still Camera Support," *Developing for Windows Operating Systems*, 1999, Microsoft Corporation.

(Continued)

*Primary Examiner*—Steven P. Sax (57) ABSTRACT

A method and system for providing video data to a user on a computer is provided. According to the method and system, a video streaming device attached to the computer provides a video stream that is displayed on the computer. Images that were previously captured with the video streaming device, either from the current video stream or from previous video streams, are displayed to the user along with the current video stream. This gives the user the impression that the device has captured image storage when, in fact, the previously captured images are actually stored elsewhere, such as on the computer's hard disk. The stored images are accessible by the computer, and placed in virtual folders while being displayed. A user interface shows the current video stream in a video display area and the previously captured images in a captured image display area. The user interface may be invoked when the user double clicks on an icon that represents the video streaming device. This gives the user the impression that he has browsed to the device and is viewing its contents.

17 Claims, 7 Drawing Sheets

U.S. PATENT DOCUMENTS

| | | | | |
|---|---|---|---|---|
| 6,070,355 | A * | 6/2000 | Day | 42/106 |
| 6,097,389 | A | 8/2000 | Morris et al. | |
| 6,118,546 | A | 9/2000 | Sanchez et al. | |
| 6,144,391 | A * | 11/2000 | Hinson et al. | 345/540 |
| 6,144,797 | A * | 11/2000 | MacCormack et al. | 386/46 |
| 6,459,920 | B1 * | 10/2002 | Hines et al. | 600/407 |
| 6,653,990 | B1 * | 11/2003 | Lestruhaut | 345/8 |
| 6,754,715 | B1 * | 6/2004 | Cannon et al. | 709/231 |
| 2001/0053276 | A1 * | 12/2001 | Boyce | 386/68 |
| 2002/0006266 | A1 * | 1/2002 | Yoon et al. | 386/69 |
| 2002/0075399 | A1 * | 6/2002 | Nemiroff et al. | 348/390.1 |
| 2003/0220541 | A1 * | 11/2003 | Salisbury et al. | 600/101 |
| 2004/0036574 | A1 * | 2/2004 | Bostrom | 340/5.82 |

OTHER PUBLICATIONS

"Microsoft Announces Windows Image Acquisition Architecture," *Microsoft PressPass*, 2000, Microsoft Corporation.

"Still Image Architecture and Windows 2000," *Developing for Windows Operating Systems*, 1999, Microsoft Corporation.

"Still Imaging Technology," *Developing for Windows Operating Systems*, 2000, Microsoft Corporation.

"WDM Video Capture Overview," *Developing for Windows Operating Systems*, 1998, Microsoft Corporation.

"Windows Image Acquisition," *Developing for Windows Operating Systems*, 2000, Microsoft Corporation.

* cited by examiner

METHOD AND SYSTEM FOR PRESENTING A VIDEO STREAM OF A VIDEO STREAMING DEVICE

CROSS REFERENCE TO RELATED APPLICATIONS

This application claims the benefit of U.S. Provisional Application No. 60/199,582, filed on Apr. 25, 2000, and incorporated herein by reference.

TECHNICAL FIELD

This invention relates generally to computer processing of video data received from a video device and, more particularly, relates to providing video data from a video streaming device to a user.

BACKGROUND OF THE INVENTION

The use of video streaming devices in conjunction with computers has become increasingly popular. A video streaming device provides a relatively constant flow of video data, which allows a user to view a live image. Typical video streaming devices include scanners and cameras, including so-called "web cams." Many of these devices have no internal memory capable of holding images. Thus, to capture and store an image from one of these devices, a user currently has to open up an application for viewing the video stream, capture an image, open a file menu, enter a path, and save the file to the entered path. Then, to retrieve the image at a later time, the user must once again open the application, remember the path in which it was saved, open the file menu, and enter the path. This is a tedious process, especially for a novice user. It can thus be seen that there is a need for a method and system in which captured images stored on a computer are presented to a user in a seamless, convenient manner.

SUMMARY OF THE INVENTION

In accordance with this need, a method and system for presenting a video stream to a user on a computer is provided herein. According to the method and system, a video streaming device attached to the computer provides a video stream that is displayed on the computer. Images, either still or moving, that were previously captured with the video streaming device, either from the current video stream or from previous video streams, are displayed to the user along with the current video stream. This gives the user the impression that the device has image storage when, in fact, the images are actually stored elsewhere, such as on the computer's hard disk. The stored images are accessible by the computer, and placed in virtual folders while being displayed. A user interface shows the current video stream in a video display area and the captured images in a captured image display area. The user interface may be invoked when the user double clicks on an icon that represents the streaming video device. This gives the user the impression that he has "browsed" to the device and is viewing the captured images as part of its contents.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning now to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computing device. Generally, program modules include routines, programs, objects, components, data structures and the like that perform particular tasks or implement particular abstract data types. Certain types of modules have specialized functions. For example, modules that are designed to facilitate communication between a computing device and internal or external hardware are often referred to as "drivers." Program modules are typically stored on computer-readable media. Computer-readable media includes, but is not limited to, Random Accessing Memory (RAM), Read-Only Memory (ROM), electrically erasable programmable read only (EEPROM), flash memory, CD-ROM, Digital versatile disk (DVD), flash memory, magnetic tape, and magnetic disk.

Functions performed by a computing device are often organized into "layers." Each layer performs a step or group of steps, and passes the results of the step or steps to the next layer via one or more programming interfaces. Layers are, themselves, made up of one or more programming modules.

One type of abstract data structure that will be referred to in the following description is a "virtual folder." A virtual folder is a logical container for a number of storage devices or network resources. In the MICROSOFT WINDOWS family of operating systems, examples of virtual folders include the "desktop," "My Computer," and "Network Neighborhood."

The invention may be implemented in variety of computing environments. For example, the invention may be realized in personal computers (PCs), hand-held devices, multiprocessor systems, microprocessor-based programmable consumer electronics, network PCs, minicomputers, mainframe computers, computerized appliances, personal digital assistants (PDAs), cellular telephones, and the like. The invention may also be practiced in distributed computing environments, where tasks are performed by remote processing devices that are linked through a communications network. In a distributed computing environment, program modules may be located in both local and remote memory storage devices. The term "computer" as used herein includes any of these computing environments.

Figure 1:
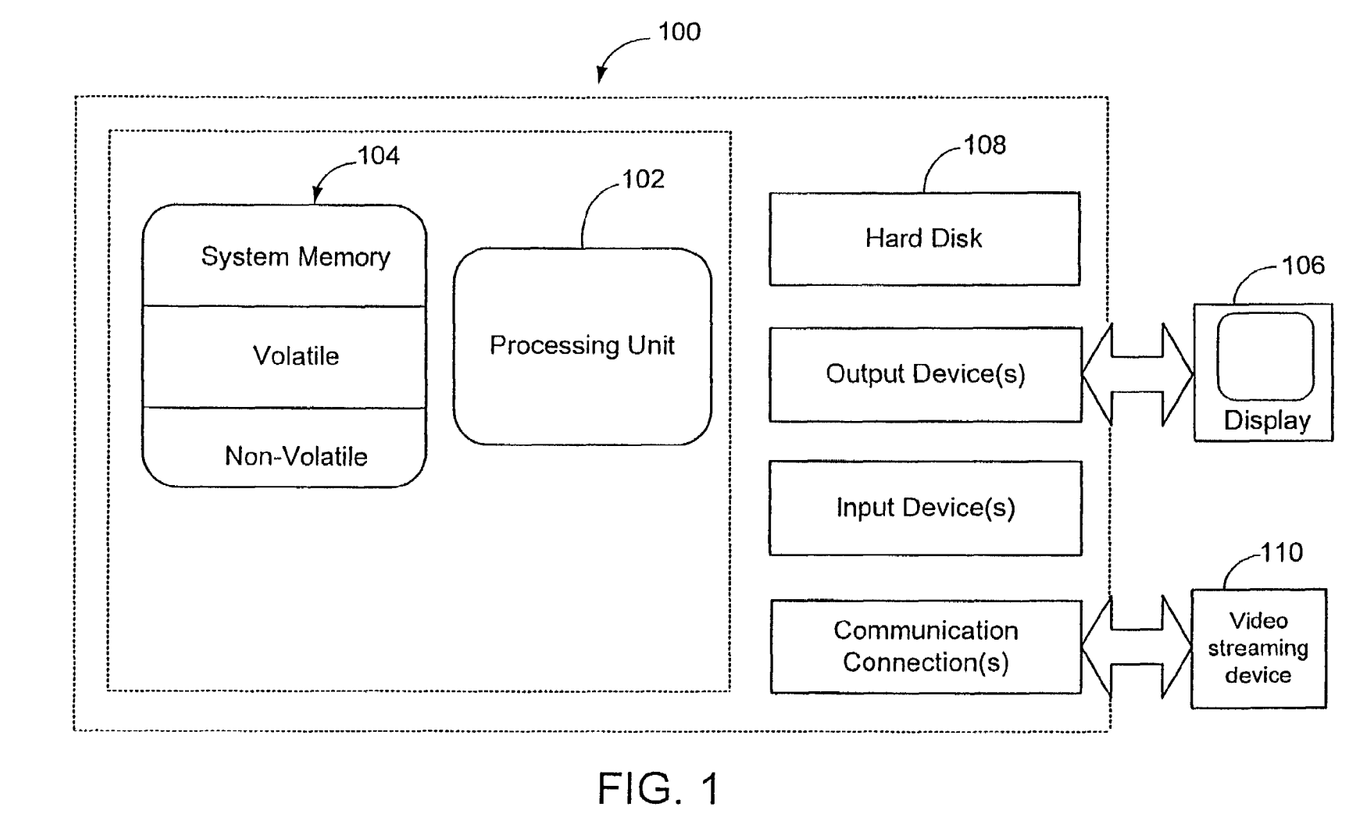
FIG. 1 is a block diagram generally illustrating an exemplary computer system on which the present invention resides.

Before describing the invention in detail, an example of a computing environment in which the invention operates will be described with reference to FIG. 1. The example computing environment includes a computing device or computer 100. In its most basic configuration, the computer 100 typically includes a processing unit 102 and memory 104. Depending on the exact configuration and type of the computer 100, the memory 104 may be volatile (such as RAM), non-volatile (such as ROM or flash memory) or some combination of the two. Additionally, the computer 100 may also have removable and/or non-removable computer-readable media. Removable computer-readable media includes, but is not limited to, optical disks, magnetic "floppy" disks, or tape. Non-removable computer-readable media includes, but is not limited to, magnetic "hard" disks. The computer 100 further includes a hard disk 108, but it is understood that the functions of the hard disk 108 may be performed by some other computer-readable media. The computer 100 may also have other input devices such as a keyboard, and/or output devices, such as a display 106. Other aspects of the computer 100 may include network connections to other devices, computers, networks, servers, etc. using either wired or wireless media. To help illustrate the invention, the computer 100 is shown as communicating with a video streaming device 110. There are many possible implementations for the device 110, including a USB web camera. All of the above-described devices are well known in the art and need not be discussed in any greater detail here.

The invention is generally directed to a method and system that allows a user to link a video streaming device to a computer, view the video stream from the device and view images previously captured with the device, thereby giving the user the impression that the captured images are actually stored on the video device when, in fact, they are not. When the invention is implemented on a computer that has both still image processing components and stream image processing components, a filter may optionally be provided to allow the video device to effectively mimic a still image device and provide still images to the still image processing components. The general term "image" as used herein refers to both still images and moving images.

Figure 2:
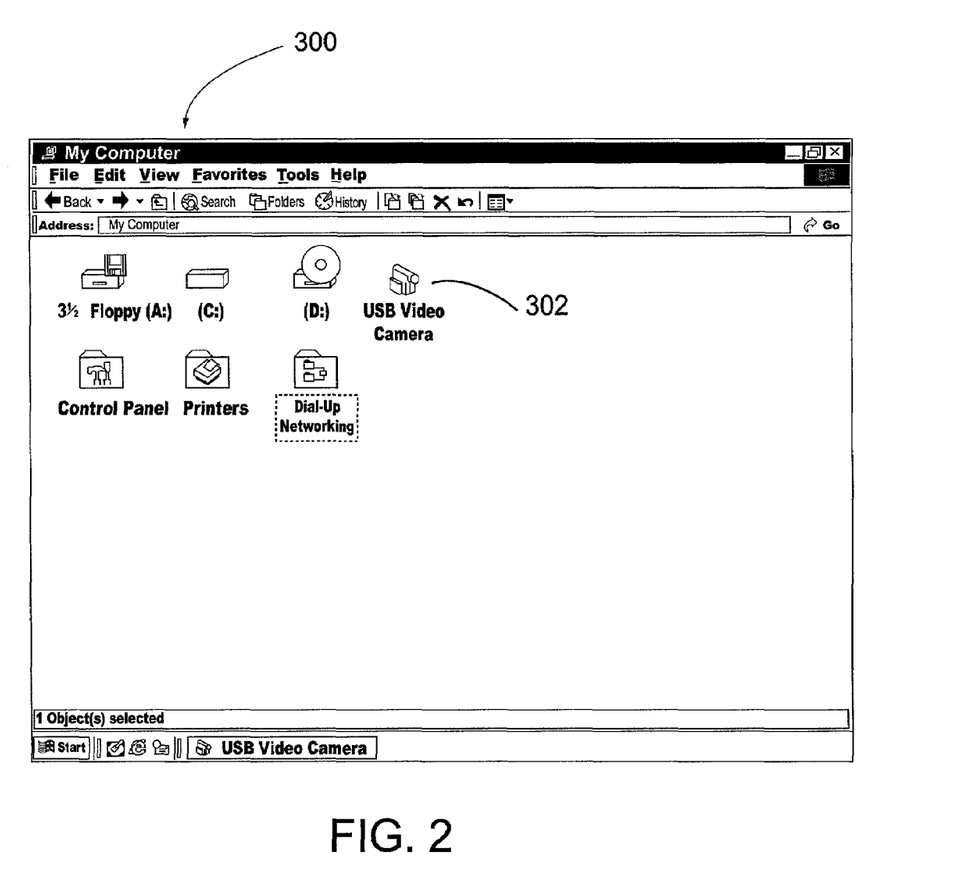
FIG. 2 is a user interface from which a user can select a video streaming device in an embodiment of the invention.

In accordance with an embodiment of the invention, a video streaming device linked to the computer 100 (FIG. 1) is represented on a user interface of the device by an icon. For example, FIG. 2 shows an interface 300 of the MICROSOFT EXPLORER UI. The interface 300 can be invoked by double clicking the "My Computer" icon of the EXPLORER "Desktop." The interface 300 includes a video camera icon 302 to represent a USB video camera. Of course, any other video streaming device may be represented as well. The user can open a dedicated view for the USB camera by double clicking the icon 302. When the user interface is implemented like a web browser, as is the UI 300 of FIG. 2, this process is also referred to as "browsing" to the video camera. Placing the camera icon 302 in the "My Computer" folder helps reinforce the illusion that the video camera has its own storage for still images, since the "My Computer" folder is customarily used to hold storage device icons.

Figure 3:
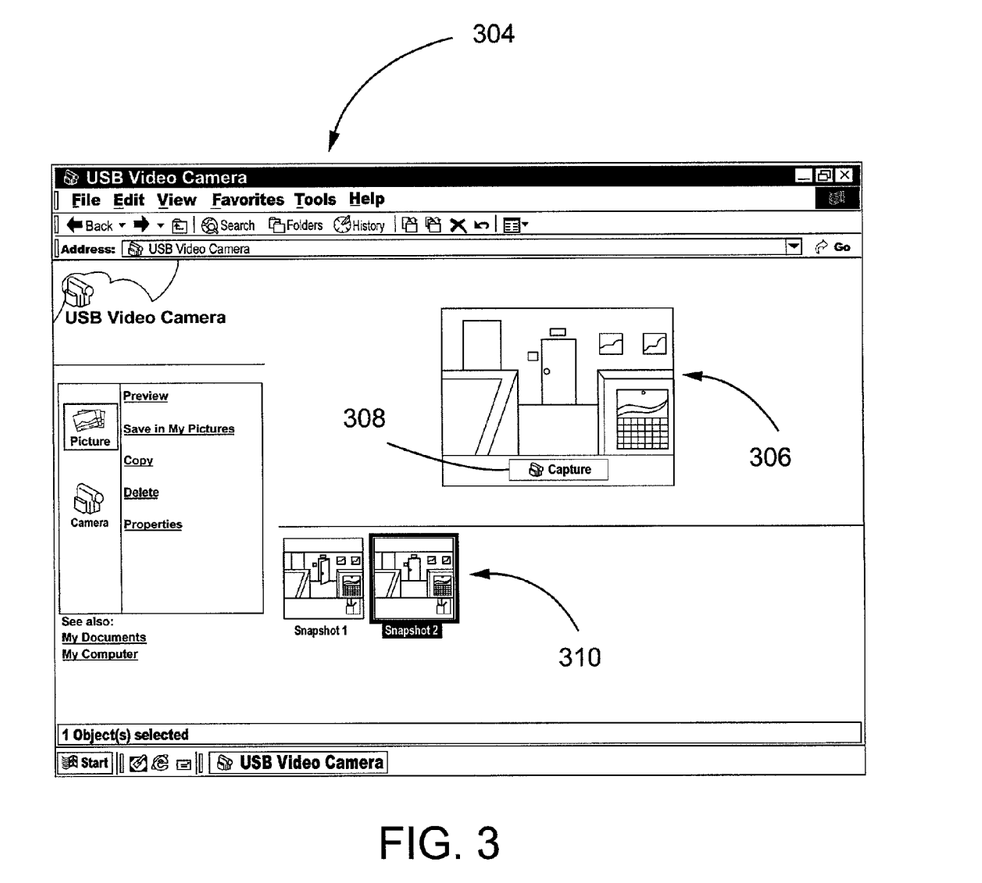
FIG. 3 is a user interface on which a user can view the video stream from a video streaming device and view previously captured images in an embodiment of the invention.

The dedicated view of the video camera is shown in FIG. 3 as an interface 304. A streaming image viewing area 306 provides the user with a real-time view of the video data coming from the USB camera. To capture a still image from the streaming image, a user activates a control such as a capture button 308. A captured image viewing area 310 displays images that have been previously captured from the video camera. Although the video camera may not have any capacity to store captured images, the present method and system is able to recognize the camera as one from which images have been previously taken, retrieve those images from storage locations accessible by the computer, such as the computer's own internal computer-readable media, and present the images to the user. Thus, even if there is a lapse of time between the capturing of the previously captured images and the generation of the current video stream, and the lapse of time involves turning off the video streaming device or breaking communication between the video streaming device and the computer, the user still has access to the previously captured images.

Figure 4:
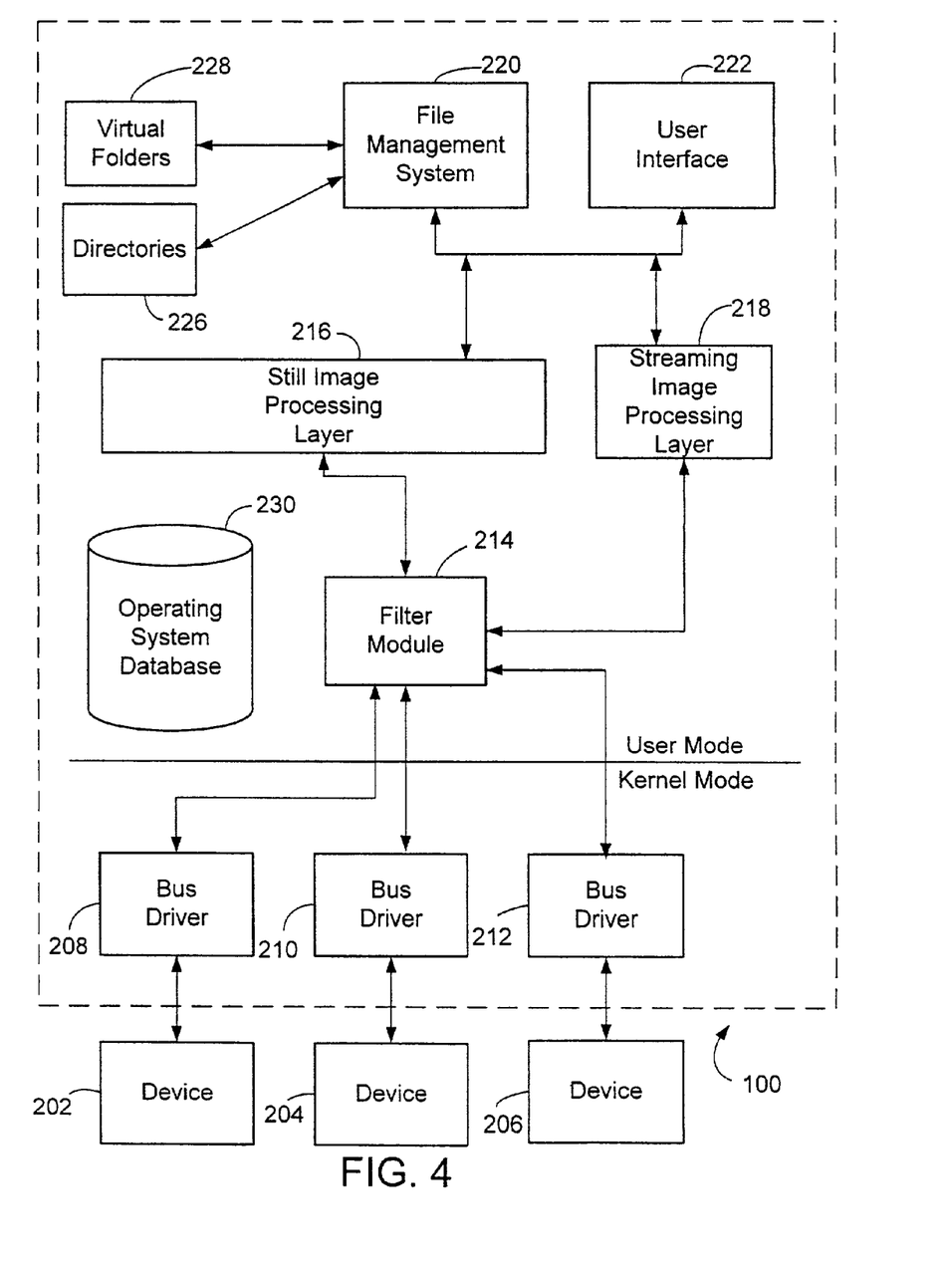
FIG. 4 is a block diagram of the software architecture used in an embodiment of the invention.

The software used to implement the invention may be structured in a variety of ways. In one embodiment, the software architecture includes a combination of user-mode and kernel mode components, as shown in FIG. 4. The kernel mode components include one or more bus drivers 208, 210 and 212. Each bus driver translates commands and data to and from a format that is understandable by a particular type of device. For example, a USB bus driver translates data and commands to and from the USB format to allow communication with USB devices. To aid in describing this architecture, it is assumed that the bus drivers are currently communicating with three devices 202, 204 and 206. A filter module 214 communicates with the bus drivers. The filter module 214 provides an interface between the bus drivers and the rest of the components of FIG. 4, and its functionality will be described below in further detail.

Figure 5:
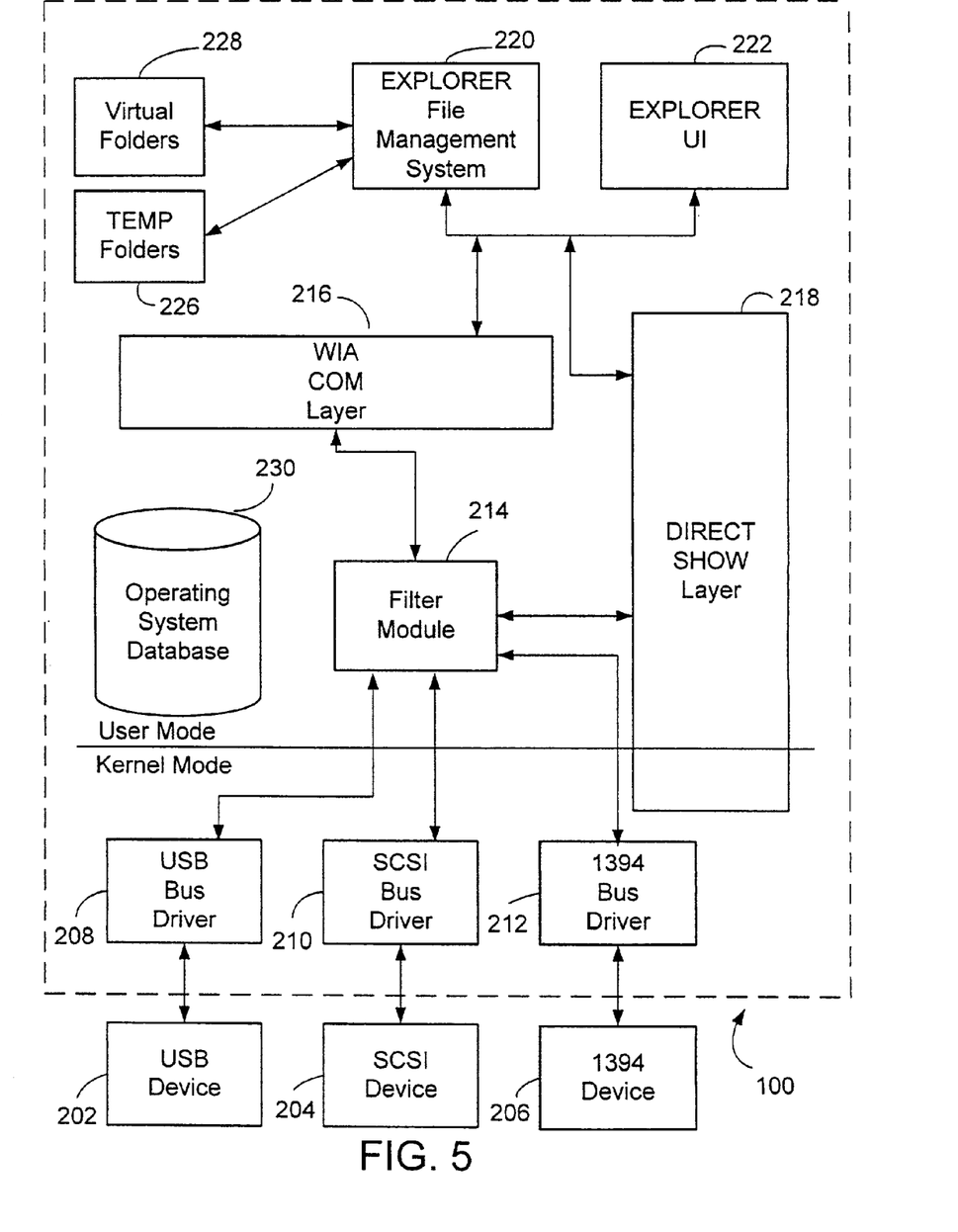
FIG. 5 is a block diagram of the software architecture of a MICROSOFT WINDOWS embodiment of the invention; and, FIG. 6 and FIG. 7 show a flow chart of a procedure used to present images in an embodiment of the invention.

Referring again to FIG. 4, a still image processing layer 216 and a streaming image processing layer 218 communicate with the filter module 214. The still image processing layer 216 processes still image data received from the filter module 214 and provides still images to other user-mode components. The still image processing layer also calls programming interfaces of the filter module 214 to convert still images received from the user components into bus-specific formats. The streaming image processing layer 218 performs the same functions as the module 216 on streaming image data. When implemented on the MICROSOFT WINDOWS family of operating systems, the still image processing layer 216 is a set of component object module (COM) objects that make up the various services of the WINDOWS IMAGE ACQUISITION (WIA) architecture. Many of the functions and components of WIA are generally described in U.S. patent application Ser. No. 09/152,432, filed Sep. 14, 1998, which is attached as an Appendix and incorporated herein by reference in its entirety. The MICROSOFT WINDOWS implementation of the streaming image layer 218 is the collection of COM objects that make up MICROSOFT DIRECT SHOW. For ease of reference, FIG. 5 shows the component of FIG. 4 labeled using MICROSOFT WINDOWS specific terms. It is understood, though, that the invention is not limited to a WINDOWS implementation.

As shown in FIG. 4, a file management system 220 communicates with the layers 216 and 218. The file management system 220 manages the storage and retrieval of data to and from a computer-readable medium accessible by the computer, such as a hard disk. The file management system 220 has a user interface (UI) 222 for allowing a user to call functions of the system 220. When implemented on the MICROSOFT WINDOWS family of operating systems, the file management system 220 is WINDOWS EXPLORER file management system. In performing its file management tasks, the file management system 220 may interact with a variety of data structures, including one or more directories 226 and one or more virtual folders 228. An operating system database 230 stores information about the various data structures and devices being used on the computer 200. When implemented on MICROSOFT WINDOWS operating system, the database 230 is the SYSTEM REGISTRY.

The filter module 214 represents a video streaming device as a streaming image device for the purpose of providing live video data or as a still image device for the purpose of providing still images. The filter module 214 recognizes when a new streaming device has been attached to the computer 200 by using such technologies as "Plug and Play." Once a new streaming device has been detected, the filter module 214 refers to the operating system database 230 to determine whether a storage location for holding still images from the video streaming device has been created. If not, then the filter module 210 creates a directory 226 for the device.

The filter module 214 then queries the video streaming device to determine whether the device has a still image pin. If the device does have a still image pin, than the filter 214 exposes the still image pin as an interface to the still image processing layer 216. If not, then the filter module 214 creates a virtual still image pin and exposes the virtual pin to the module 216. The filter module 214 also exposes the streaming pin of the device as an interface to the streaming image processing module 218. When the filter 214 receives streaming image data from a streaming image device, it routes the data to the streaming image processing module through the exposed streaming pin interface. If the user initiates a capture of the video data, then the filter module 214 routes the captured still image to the still image processing layer 216 through the exposed still image pin interface. By treating the video stream from the device as a still image input during capture operations, the filter 214 is able to leverage existing still image software of the computer 100 while taking advantage of new streaming video software.

Figure 6:
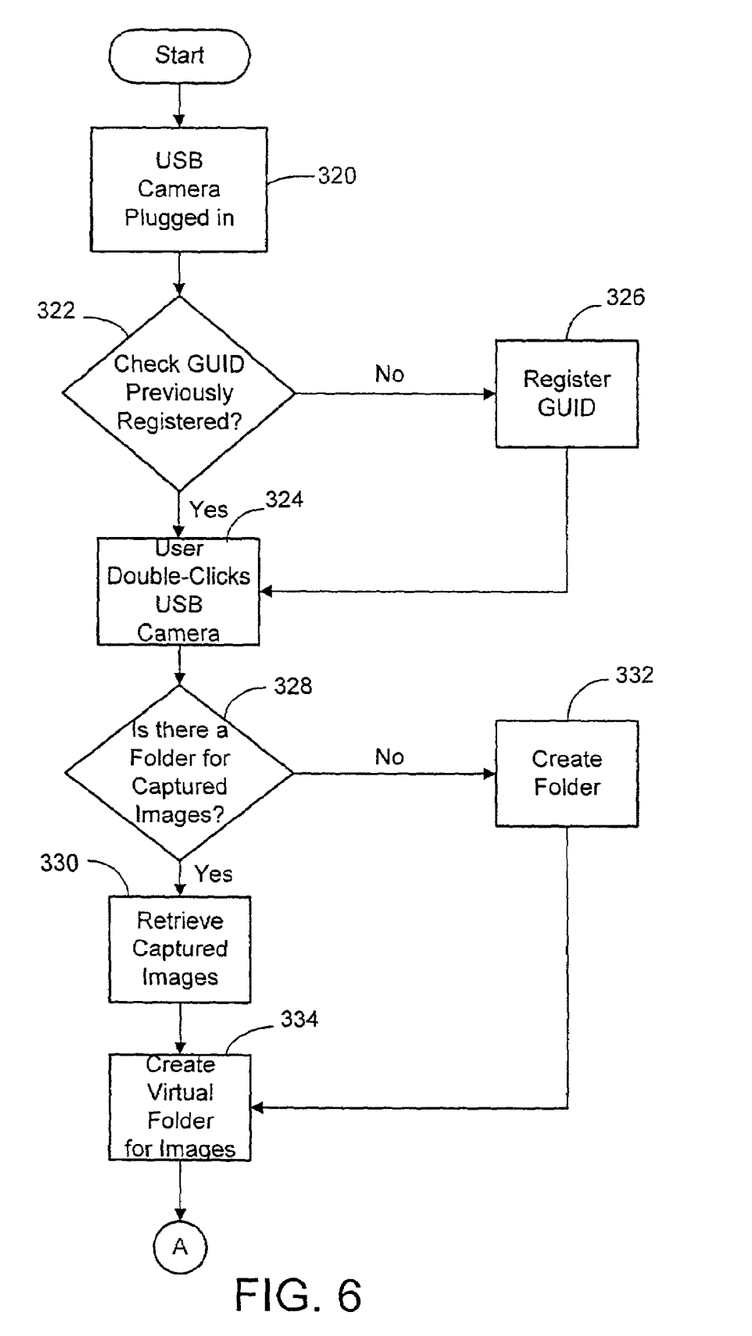
Figure 7:
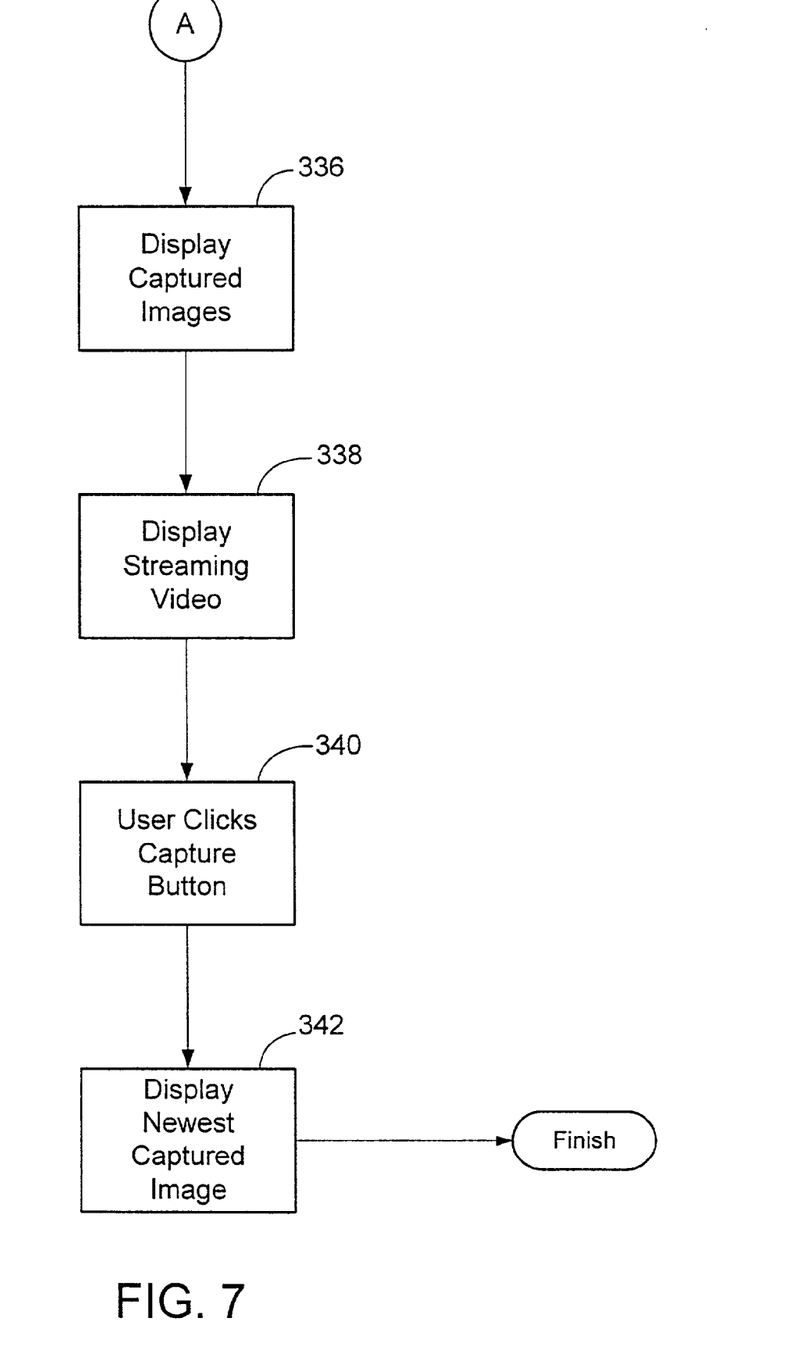

The procedure followed to provide video data from a video streaming device to a computer user according to an embodiment of the invention will now be described. This procedure is assumed to be executed using a USB camera in conjunction with a computer running one of the MICROSOFT WINDOWS family of operating systems. The procedure starts at step 320 of FIG. 6, at which the user plugs the USB camera, represented by the device 202 of FIG. 5, into the computer 100. At step 322, the plug and play software (not shown) of the computer 100 determines the globally unique ID number (GUID) of the USB camera through a well known technique. The plug and play software then checks the operating system registry 230 to see if the camera has been previously registered. If so then the flow proceeds to step 324. If not, then the plug and play software registers the camera's GUID in the registry 230 at step 326.

At step 328, the user double-clicks the "USB camera" icon 302 of the interface 300 (FIG. 2). The EXPLORER module 220 (FIG. 5) responds by looking up the camera's GUID in the system registry 230 to determine whether a folder currently exists on the computer's computer-readable media for storing the captured images taken within the camera. If a folder does exist, then the EXPLORER module 220 opens it and retrieves the captured images at step 332. If no folder currently exists from the EXPLORER module 220 creates a folder in the TEMP directory of the computer 100 at step 330. The EXPLORER module 220 also registers the folder in the registry 230. Each video streaming device preferably has its own folder in the TEMP directory for holding captured images. The various folders of the TEMP directory associated with the streaming devices are collectively labeled in FIG. 5 with reference numeral 226.

At step 334, the EXPLORER module 220 (FIG. 5) creates a virtual folder on the computer's hard disk for temporarily storing the images retrieved from the TEMP folder. The various virtual folders for video streaming devices are collectively labeled in FIG. 5 with reference numeral 228. Each video streaming device that is currently attached to the computer 100 preferably has its own virtual folder. Virtual folders are well known and are accessible through the EXPLORER file management system of the WINDOWS family of operating systems. At step 336, the EXPLORER module 220 presents the UI 300 of FIG. 3 and displays the images stored in the USB camera's virtual folder in the captured image viewing area 310. These images may have been captured recently by the user, or there may have been lapse of time between when they were captured and the present. Additionally, the video streaming device may have been turned off since the time the images were captured. The EXPLORER module 220 receives the video stream coming from the device 202 through the DIRECT SHOW module 218 and displays it in the viewing area 306. As previously discussed, the filter module 214 provides the video stream data to the DIRECT SHOW module.

At step 340, the user clicks on the "capture" button 308 (FIG. 3). The WIA layer 216 (FIG. 5) responds to this event by requesting the captured image from the filter module 214. The filter module 214 then obtains the captured image from the camera's still image pin (the physical pin or the virtual pin) and sends the image to the WIA module 216. At step 342, the WIA layer calls the EXPLORER module 220 and causes the EXPLORER module 220 to display the captured image on the UI 304 in the viewing area 310 (FIG. 3). Thus, the procedure has created the illusion that the USB device 202 has storage for previously captured images and that the previously captured images are located in that fictional storage.

It can thus be seen that a new a useful method and system for presenting a video stream from a video streaming device has been provided. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

The invention claimed is:

1. A method comprising: receiving input from a video capturing device, the input including an identifier associated with the video capturing device and a video stream; retrieving an identifier from a storage, the retrieved identifier corresponding to the received identifier associated with the video capturing device; locating a directory corresponding to the retrieved identifier, the directory containing one ore more stored images previously captured by the video capturing device; presenting a view of the video stream currently being captured by the video capturing device to a user; contemporaneously presenting the one or more stored images previously captured by the video capturing device to the user; presenting in a user interface a control for capturing a still image from the view of the video stream being displayed in the video display area; and in response to the user activating the control, capturing the still image and adding it to the previously captured stored images; and presenting a folder to the user; in response to the user selecting the folder, displaying an icon representing a video capturing device; and in response to the user selecting the video capturing device icon, displaying a real-time view of the video stream currently being captured by the video capturing device along with one or more images that were previously captured by the video capturing device.

2. A computer-readable medium having stored thereon computer-executable instructions for performing the method of claim 1.

3. The method of claim 1, wherein the directory is at a storage location accessible by a computer, the method further comprising presenting the previously captured stored images to the user on a display of the computer.

4. The method of claim 3, wherein the storage location is a virtual folder.

5. The method of claim 1, further comprising displaying to the user a user interface having a streaming video display area in which the view of the video stream is displayed and a captured image display area in which the previously captured stored images are displayed.

6. The method of claim 1, further comprising presenting one or more user controls for capturing a still image from the video stream and presenting the captured image to the user along with one or more previously captured still images.

7. The method of claim 1, wherein the view of the video stream is presented on a computer, and wherein there was a break in communication between the video capturing device and the computer between the time that the previously captured images were taken and the time that the view of the video stream is being presented.

8. The method of claim 1, wherein the view of the video stream is presented on a computer, and wherein the computer was turned off between the time that the previously captured images were taken and the time that the view of the video stream is being presented.

9. A system comprising: a computer for receiving a video stream from a video capturing device and executing one or more software modules to process the video stream; and a display communicatively coupled to the computer, wherein the executed software modules render a view of the view of the video stream currently being captured by the video capturing device; identifies a directory containing one or more previously captured images by the video capturing device base on an identifier of the video capturing device and a corresponding identifier of the directory; and displays the one or more previously captured images on the display contemporaneously with the view of the video stream; presents in a user interface a control for capturing a still image from the view of the video stream being displayed in the video display area; and in response to the user activating the control, capturing the still image and adding it to the previously captured stored images; and presents a folder to the user; in response to the user selecting the folder, displays an icon representing a video capturing device; and in response to the user selecting the video capturing device icon, displays a real-time view of the video stream currently being captured by the video capturing device along with one or more images that were previously captured by the video capturing device.

10. The system of claim 9, further comprising storage media for storing the previously captured images.

11. The system of claim 9, wherein the one or more software modules comprises a user interface for displaying the view of the video stream and the previously captured images, the user interface having a control for allowing a user to capture a still image from the view of the video stream.

12. The system of claim 11, wherein the one or more software modules further comprises a still image processing layer for processing the image captured by user and presented it to the other software modules.

13. The system of claim 12, wherein the one or more software modules further comprises a filter module for determining whether the video capturing device has a still image pin, and if the video capturing device is determined to have a still image pin, exposing the video capturing device to the still image processing layer as a still image device.

14. The system of claim 9, further comprising a computer-readable medium accessible by the computer, wherein the computer further executes a file management software module for managing the storage and retrieval of data to and from the computer-readable medium, and wherein the file management software module represents the video capturing device to the user as a storage device, thereby further reinforcing an illusion that the previously captured images are stored on the video capturing device.

15. The system of claim 14, wherein when a user selects the video capturing device using the file management software module, the file management software module retrieves the previously captured images from the computer-readable medium and presents them to the user as if they were stored on the video capturing device.

16. The system of claim 15, wherein the computer-readable medium includes a means for storing the previously captured images.

17. The system of claim 16, wherein the storing means is a virtual folder.

* * * * *